US012755430B2

(12) United States Patent
Voorhaar

(10) Patent No.: US 12,755,430 B2
(45) Date of Patent: Oct. 6, 2026

(54) METHODS, APPARATUSES AND COMPUTER PROGRAMS FOR DETERMINING AND USING EXTRINSIC CALIBRATION OF ONE OR MORE CAMERAS

(71) Applicant: Yokogawa Electric Corporation, Tokyo (JP)

(72) Inventor: Willem Hendrik Voorhaar, Copenhagen (DK)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 19/230,197

(22) Filed: Jun. 6, 2025

(65) Prior Publication Data

US 2025/0378582 A1 Dec. 11, 2025

(30) Foreign Application Priority Data

Jun. 6, 2024 (EP) .................................... 24180458

(51) Int. Cl.
*G06T 7/80* (2017.01)
*G06T 7/55* (2017.01)

(52) U.S. Cl.
CPC .................. *G06T 7/80* (2017.01); *G06T 7/55* (2017.01); *G06T 2207/30204* (2013.01); *G06T 2207/30244* (2013.01)

(58) Field of Classification Search
CPC ....................................................... G06T 7/80
See application file for complete search history.

(56) References Cited

U.S. PATENT DOCUMENTS 10,839,557 B1 * 11/2020 Arora .................... G06T 19/006
2004/0233461 A1 11/2004 Armstrong et al.

OTHER PUBLICATIONS

Sturm, Peter; Ramalingam, Srikumar, A Generic Concept for Camera Calibration, DOI 10.1007/978-3-540-24671-8_1.

(Continued)

*Primary Examiner* — Michael H Hong
(74) *Attorney, Agent, or Firm* — Sughrue Mion, PLLC

(57) ABSTRACT

Examples of the present disclosure relate to a computer-implemented method, an apparatus, and a computer program for extrinsic calibration of one or more cameras with respect to a reference coordinate system, and to various methods, apparatuses, and computer programs for using information on a pose of a reference plane being determined as part of the extrinsic calibration. The computer-implemented method for extrinsic calibration of one or more cameras with respect to a reference coordinate system comprises obtaining one or more images from one or more cameras, with each camera having a field of view, wherein each image shows an observation of at least one marker of a plurality of markers, wherein the plurality of markers are co-planar with respect to a reference plane, estimating, for the one or more cameras, a transformation between a respective camera coordinate system and the reference coordinate system based on an estimated pose of the at least one marker observed in the field of view of the camera relative to the camera coordinate system, estimating a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system, estimating planar poses of the plurality of markers with respect to the reference plane, and simultaneously adjusting the planar poses of the plurality of markers (Continued)

and the pose of the reference plane with respect to the respective one or more camera coordinate systems by iteratively reducing an error between a reprojection of the plurality of markers into the respective one or more camera coordinate systems and the position of the respective markers in the images.

15 Claims, 5 Drawing Sheets

(56) References Cited

OTHER PUBLICATIONS

Zhang, Liuxin; Li, Bin; Jia, Yunde, A Practical Calibration Method for Multiple Cameras, DOI 10.1109/ICIG.2007.59, https://ieeexplore.ieee.org/abstract/document/4297052.
Ueshiba; Tomita, Plane-based calibration algorithm for multi-camera systems via factorization of homography matrices, DOI 10.1109/ICCV.2003.1238453, https://ieeexplore.ieee.org/document/1238453.
Maas, Hans-Gerd, Image sequence based automatic multi-camera system calibration techniques1, DOI 10.1016/S0924-2716(99)00029-5, https://www.sciencedirect.com/science/article/abs/pii/S0924271699000295.
Pedersini, F.; Sarti, A.; Tubaro, S., Accurate and simple geometric calibration of multi-camera systems, DOI 10.1016/S0165-1684(99)00042-0, https://www.sciencedirect.com/science/article/abs/pii/S0165168499000420.
Detchev, I.; Mazaheri, M.; Rondeel, S.; Habib, A., Calibration of multi-camera photogrammetric systems, DOI 10.5194/isprsarchives-XL-1-101-2014.
Rameau, F.; Park, J.; Bailo, O.; Kewon, I.S., MC-Calib: A generic and robust calibration toolbox for multi-camera systems, DOI 10.1016/j.cviu.2021.103353, https://www.sciencedirect.com/science/article/abs/pii/S1077314221001818.
Amy Tabb et al., Multi-camera calibration with pattern rigs, including for non-overlapping cameras: Calico, arxiv.org, Cornell University Library, 201 Olin Library Cornell University Ithaca, NY 14853, Mar. 27, 2024.

* cited by examiner

METHODS, APPARATUSES AND COMPUTER PROGRAMS FOR DETERMINING AND USING EXTRINSIC CALIBRATION OF ONE OR MORE CAMERAS

Examples of the present disclosure relate to a computer-implemented method, an apparatus, and a computer program for extrinsic calibration of one or more cameras with respect to a reference coordinate system, and to various methods, apparatuses, and computer programs for using information on a pose of a reference plane being determined as part of the extrinsic calibration.

BACKGROUND

Multi-camera calibration is a type of calibration used in multi-camera systems. Camera calibration can be divided into two stages: intrinsic calibration and extrinsic calibration. In the intrinsic calibration stage, the lens parameters of a particular camera are estimated, which allows the translation of 3-dimensional points in a coordinate system centered at the camera to be translated to pixels. In the extrinsic calibration stage, a camera's pose (position and orientation) is determined with respect to a reference coordinate system. This allows translating 3-dimensional points in the reference coordinate system to the coordinate system centered at the camera.

In the extrinsic calibration stage, assuming that the cameras in the system have an accurate intrinsic calibration, the pose of each camera in the multi-camera system is determined with respect to a single global reference coordinate system. Applicable methods for multi-camera calibration depend on the configuration of the multi-camera system. Each camera has its own field of view (FoV), i.e. that part of the world that is visible to that particular camera. A camera system is globally overlapping if there is some region of the world that is inside the FoV of every single camera in the system. Alternatively, the camera system can be non-globally overlapping if there is no region in the world that is inside the FoV of every single camera, but every camera has an overlapping FoV with at least one other camera. In addition, if cameras are represented as a node in a mathematical graph where two cameras are connected by an edge if they have overlapping FoV, then this mathematical graph is required to be connected. That is, there exists a path between any two cameras. Alternatively, the camera system can be non-overlapping, which is the most general case, where cameras are not required to have an overlapping FOV with any other camera.

The calibration of non-globally overlapping camera systems is conventionally performed by observing one or more fiducial markers (such as a checkerboard pattern, or an ArUco marker, a popular type of two-dimensional marker) in one or more images. Using the fact that two or more cameras observe the same fiducial markers, a correspondence between the coordinate systems of the cameras can be obtained. The relative orientation of all cameras with respect to a reference coordinate system can then be obtained by simultaneously finding the pose of each camera with respect to each observed fiducial marker and finding the pose of each fiducial marker with respect to a reference coordinate system. This is a non-linear optimization problem and is conventionally solved using the Levenberg-Marquardt algorithm. Existing methods using multiple fiducial markers can be divided into two categories: either a complete spatial relationship between the markers is known (for instance if there are multiple markers are on a rigid planar board), which is usually the case, or no spatial relationship between markers is known. Furthermore, a large body of research is devoted to studying different types of calibration patterns or fiducial markers to solve the calibration problem.

However, some existing methods are not robust to outliers and spurious detections of fiducial markers. Moreover, some techniques require a priori knowledge of the spatial relationship between markers. Establishing an accurate reference plane is not always possible with existing approaches, limiting downstream applications. Furthermore, some methods require special difficult-to-manufacture or large-scale markers, operator training and/or customized marker detection frames. In existing techniques, support for multiple reference frames with automatic determination of their spatial relationship is often lacking.

There may be a desire for providing an improved technique for extrinsic calibration of one or more cameras with respect to a reference coordinate system, that addresses at least some of the shortcomings of existing techniques.

SUMMARY

This desire is addressed by the subject-matter of the independent claims.

Various examples of the present disclosure are based on the finding, that the extrinsic calibration is facilitated when certain conditions are imposed on the markers being used for the extrinsic calibration. In other approaches, the conditions imposed are the use of complex, large and difficult to manufacture calibration patterns or the use of at least one marker that can be observed by each camera. In the present concept, the condition is much simpler and easier to achieve in real life—the markers need to be co-planar to a reference plane. In real-life scenarios, this can be achieved by putting the markers onto the floor, onto tables etc. standing on the floor, or by putting the markers onto a wall, without enforcing a known spatial relationship between the markers. This way, simple markers, and in particular markers that can be printed onto sheets of papers, can be used to perform the extrinsic calibration in nearly arbitrary scenes being observed by a non-globally overlapping camera system, with little effort and operator knowledge required for performing the extrinsic calibration. Moreover, as part of the extrinsic calibration, a reference plane is established with a high degree of precision.

Some aspects of the present disclosure relate to a computer-implemented method for extrinsic calibration of one or more cameras with respect to a reference coordinate system. The method comprises obtaining one or more images from one or more cameras, with each camera having a field of view. Each image shows an observation of at least one marker of a plurality of markers. The plurality of markers are co-planar with respect to a reference plane. The method comprises estimating, for the one or more cameras, a transformation between a respective camera coordinate system and the reference coordinate system based on an estimated pose of the at least one marker observed in the field of view of the camera relative to the camera coordinate system. The method comprises estimating a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system. The method comprises estimating planar poses of the plurality of markers with respect to the reference plane. The method comprises simultaneously adjusting the planar poses of the plurality of markers and the pose of the reference plane with respect to the respective one or more camera coordinate systems by iteratively reducing an error between a reprojection of the plurality of markers, and in particular of the planar poses of the markers, into the respective one or more camera coordinate systems and the position of the respective markers in the images. This approach, which is based on the co-planarity condition imposed upon the markers, provides a low-complexity extrinsic calibration technique that is suitable for single cameras or non-globally overlapping camera system, with little effort and operator knowledge required, while establishing a highly precise reference plane.

In general, the goal of extrinsic calibration is to determine how the coordinate system of the camera(s) are oriented and offset relative to the reference coordinate system. Accordingly, the extrinsic calibration may correspond to or comprise the pose of the one or more camera coordinate systems with respect to the reference coordinate systems. The extrinsic calibration may be based on the pose of the reference plane with respect to the respective one or more camera coordinate systems and the reference coordinate system.

In various implementations, the Levenberg-Marquardt algorithm may be used for adjusting the planar poses of the plurality of markers and the pose of the reference plane with respect to the respective one or more camera coordinate systems. By setting co-planarity as constraint for the pose of the plurality of markers, the Levenberg-Marquardt algorithm can be used to simultaneously adjust (i.e., optimize) the pose(s) of the camera(s) and the poses of the plurality of markers.

While the proposed method can be used for single cameras, it is particularly suitable for extrinsic calibration of multi-camera systems. Accordingly, the one or more cameras may correspond to a plurality of cameras having a plurality of camera coordinate systems. The fields of view of the respective cameras may partially overlap, so that, for each camera, there is at least one marker in the field of view of the camera that is also observed in the field of view of another camera. In particular, the fields of view of the cameras may be non-globally overlapping.

For example, the planar poses of the plurality of markers and the pose of the reference plane with respect to the respective camera coordinate systems may be adjusted with the goal of reducing a combination of the reprojection errors simultaneously for the plurality of cameras. By reducing a combination of the reprojection errors simultaneously, less impact may be given to single markers that are placed or detected in a sub-optimal manner.

As a starting point, operations may be performed to determine a coarse orientation of the fields of view relative to each other. Thus, the method may comprise determining a relationship between the fields of view of the plurality of cameras based on the at least one marker observed in overlapping regions of the respective fields of view. This may be used as starting point for determining a rigid transformation between camera coordinate systems of different cameras.

In multi-camera systems, care may be taken that the fields of view are non-globally overlapping. In some examples, the method may comprise constructing a graph, with the graph comprising a plurality of nodes representing the plurality of cameras and a plurality of edges representing markers of the plurality of markers being in overlapping fields of view of two cameras. By modeling the overlapping fields of view of the cameras as a graph, graph operations can be used to determine whether the fields of view are non-globally overlapping. In particular, the method may comprise determining the graph to be a connected graph, and providing an alert if the graph is not connected. If the graph is not connected, then the camera system is not a non-globally overlapping camera system. In this case, one or more additional markers may be placed (if the fields of view are non-globally overlapping, but there is no marker in one of the overlapping regions), or the field(s) of view of one or more cameras may be adjusted by adjusting the pose of the respective camera (s), to make sure that the camera system is deemed to be non-globally overlapping.

In some examples, the method comprises, for at least a subset of the edges of the graph, estimating a rigid transformation between the camera coordinate systems of the cameras being connected by the respective edge, and estimating the transformation between the respective camera coordinate systems and the reference coordinate system based on the rigid transformations between the camera coordinate systems. This rigid transformation may be used as a starting point for determining the rigid transformation between the camera coordinate systems and the reference coordinate system.

One benefit of the proposed concept is that few constraints are imposed onto the markers being used. In particular, there is no need for a large-format checkerboard or similar calibration target. Individual printed and/or cheap markers may be placed throughout the room, in arbitrary orientation, as long as the co-planarity constraint is satisfied. Markers that are partially or entirely obscured from the field of view of one or more cameras, e.g., due to furniture, may simply be disregarded. In other words, the method may comprise disregarding, during the process of determining the relationship between the fields of view of the plurality of cameras, one or more markers of the plurality of markers that are at least partially obscured by an obstacle in one of the fields of view.

In general, the adjustment procedure (which is an optimization procedure) is based on reducing the reprojection error. To determine the reprojection error, the coordinates of the (vertices of the) markers (i.e., the at least one markers observed in the field of view of the respective camera) are determined in the camera coordinate system, transformed into the global coordinate system, used to determine the planar poses of the markers, and then reprojected into the camera coordinate system to determine the pixel coordinates at which the marker should be visible. Accordingly, the method may comprise estimating poses of the plurality of markers in the respective one or more camera coordinate systems based on the images, transforming the three-dimensional coordinates and poses into the reference coordinate system, determining the planar poses of the plurality of markers, and determining the reprojection of the plurality of markers into the respective one or more camera coordinate systems based on the planar poses of the plurality of markers. If the transformation between the respective camera coordinate system and the global coordinate system and the resulting planar poses are correct, the reprojection of a marker should match the marker observed in the image. The planar poses of the plurality of markers and the pose of the reference plane may be adjusted with respect to the respective camera coordinate systems to improve the match between the reprojection and the image(s), and thus reduce the reprojection error.

Optimization algorithms, such as the aforementioned Levenberg-Marquardt algorithm, require a suitable starting point for the iterative adjustment/optimization, as they are based on identifying local minima. Therefore, the pose of the reference plane may first be estimated with respect to the reference coordinate system, and then be translated into the respective camera coordinate systems for the subsequent adjustment. For example, the method may comprise estimating the pose of the reference plane with respect to the reference coordinate system by fitting poses of the plurality of markers in the reference coordinate system to a plane, with the fitting being based on reducing a least-square projection error. A least-square-based approach is suitable for identifying the reference plane (and any plane being co-planar to the reference plane).

The proposed concept is based on the co-planarity constraint for the pose of the plurality of markers. This co-planarity constraint can, for example, be used as a constraint for the determination of the reference plane, as the individual markers are necessarily co-planar to this plane. Accordingly, estimating the planar poses of the plurality of markers with respect to the reference plane may comprise, for each marker, reducing a projection error onto the reference plane or a plane being co-planar with the reference plane for the observation or observations of the marker. The co-planarity constraint means that the planar poses are constrained to a single rotation angle and a two-dimensional translation vector with respect to the reference plane or to a plane being co-planar to the reference plane. This greatly facilitates the determination of the reference plane from the poses of the plurality of markers.

In some cases, markers may be observed that are not co-planar with the reference plane, or their pose may be detected erroneously in the camera coordinate space. To avoid such markers skewing the extrinsic calibration, they may be detected as outliers for violating the co-planarity constraint and disregarded for the extrinsic calibration. Thus, the method may comprise identifying, during the adjustment of the planar poses and the pose of the reference plane with respect to the respective one or more camera coordinate systems, one or more outlier marker observations based on the error between the reprojection of the respective marker into the camera coordinate system and the position of the marker in the image and disregarding the one or more outlier marker observations.

Another benefit of at least some examples of the proposed concept is that a single image from each camera suffices to perform the extrinsic calibration. Thus, the extrinsic calibration may be performed using a single image from each camera.

In the previous discussion, it was assumed that a single reference plane is used. However, the proposed concept is not constrained to a single reference plane but can be used with multiple reference planes on which markers are placed, e.g., a floor and a wall, or two walls. For example, the images may show two or more sets of markers being co-planar with two or more reference planes. The planar poses of the two or more sets of markers may be estimated with respect to the two or more reference planes. The poses of the two or more reference planes may be estimated with respect to the respective one or more camera coordinate systems based on the pre-defined or estimated poses of the two or more reference planes with respect to the reference coordinate system and based on the estimated transformations between the one or more camera coordinate systems and the reference coordinate system. The planar poses of the plurality of markers and the pose of the two or more reference planes with respect to the respective one or more camera coordinate systems may be simultaneously adjusted by iteratively reducing the error between the reprojection of the plurality of markers into the respective one or more camera coordinate systems and the position of the respective markers in the images. This may further improve the precision of the extrinsic calibration, and may be used to establish multiple reference planes, which may be used for different purposes.

The proposed concept is agnostic to the type of calibration pattern and marker used. For example, fiducial markers may be used. For example, the plurality of markers may comprise at least one fiducial marker that is manually placed on one of a wall, a floor, and a table of an environment in which the multi-camera system is being used. For example, the plurality of markers may comprise at least one marker that is printed onto a sheet of material to be placed on one of a wall, a floor, and a table of an environment in which the multi-camera system is being used. This enables the use of cheap and easy to manufacture fiducial markers. Additionally, or alternatively, at least some of the markers may be projected. In other words, the plurality of markers may comprise at least one projected marker being projected by a projector onto one of the wall, the floor, and the table of an environment in which the multi-camera system is being used. Thus, the proposed concept may be used in a various scenarios, with markers that are easy and cheap to produce or project.

In some examples, the reference plane may be defined relative to one of the plurality of markers. For example, the method may comprise selecting a reference marker among the plurality of markers, and setting an origin of the reference plane based on the position of the reference marker on the reference plane. This may be useful in downstream applications using the pose of the reference plane.

To simplify the extrinsic calibration process, the coordinate system of one of the cameras may be used as reference coordinate system. In other words, the one or more cameras may be a plurality of cameras having a plurality of camera coordinate systems, with the reference coordinate system being a camera coordinate system of one of the plurality of cameras.

In some examples, at least one of the markers has known physical dimensions. This way, the distance between the camera(s) and the marker can be determined.

In addition to the extrinsic calibration, the intrinsic calibration of the camera(s) may be fine-tuned as well. For example, the method may comprise refining an intrinsic calibration of the one or more cameras based on the plurality of markers being co-planar to the reference plane. Additionally, or alternatively, the method may comprise refining the intrinsic calibration of the one or more cameras during the adjustment of the planar poses of the plurality of markers and the pose of the reference plane with respect to the respective one or more camera coordinate systems. This may further improve the overall calibration of the camera system.

To further improve the precision of the calibration, depth information may be used as well, e.g., depth information included in the images. For example, if the images comprise depth information, the method may comprise determining a depth of the plurality of markers in the respective one or more camera coordinate systems and in the reference coordinate system based on the depth information. The method may comprise simultaneously adjusting the planar and the pose of the reference plane with respect to the respective one or more camera coordinate systems by iteratively reducing a combined reprojection and depth error between the reprojection of the plurality of markers into the respective one or more camera coordinate systems and the position and depth of the respective markers in the images.

The reference plane being determined during the extrinsic calibration may be re-used in various downstream applications, as will be presented in the following:

Some aspects of the present disclosure relate to a method for projecting an image onto a surface. The method comprises obtaining information on a pose of a reference plane with respect to a reference coordinate system, with the information on the pose of the reference plane having been determined using the computer-implemented method for extrinsic calibration of the one or more cameras with respect to the reference coordinate system. The method comprises controlling a projector to project an image onto the surface based on the information on the pose of the reference plane, with the surface corresponding to the reference plane or being co-planar to the reference plane. In this application, the pose of the reference plane may be used to determine a highly precise determination of a projection surface.

Some aspects of the present disclosure relate to a method for determining a pose of an object. The method comprises obtaining information on a pose of a reference plane with respect to a reference coordinate system, with the information on the pose of the reference plane having been determined using the computer-implemented method for extrinsic calibration of the one or more cameras with respect to the reference coordinate system. The method comprises determining the pose of the object based on the pose of the reference plane with respect to the reference coordinate system, wherein the object is assumed to be parallel to a surface corresponding to the reference plane or being co-planar to the reference plane. A highly precise reference plane greatly reduces the effort for determining the pose of the object, as some dimensions of the pose of the object are fixed by the pose of the reference plane.

Some aspects of the present disclosure relate to a method for markerless motion capture or object tracking. The method comprises obtaining information on a pose of a reference plane with respect to a reference coordinate system, with the information on the pose of the reference plane having been determined using the computer-implemented method for extrinsic calibration of the one or more cameras with respect to the reference coordinate system. The method comprises using the pose of the reference plane with respect to the reference coordinate system as floor plane constraint for the markerless motion capture or object tracking. Using the reference plane to set a highly precise floor plane constraint facilitates the markerless capture, e.g., as feet or other body parts cannot enter the floor and as the object or body is, if not moving, assumed to be standing or lying on the floor, and object tracking, in particular single-camera object tracking, as bounding boxes can be constrained by the floor plane constraint.

Another aspect of the present disclosure relates to an apparatus, e.g., to an apparatus for extrinsic calibration of one or more cameras with respect to a reference coordinate system. The apparatus comprises one or more processors and one or more interfaces. The apparatus is configured to perform at least one of the above methods.

Another aspect of the present disclosure relates to a computer program comprising instructions which, when the program is executed by a computer, cause the computer to carry out at least one of the above methods.

Another aspect of the present disclosure relates to a non-transitory, computer-readable medium comprising a program code that, when the program code is executed on a processor, a computer, or a programmable hardware component, causes the processor, computer, or programmable hardware component to perform at least one of the above methods.

BRIEF DESCRIPTION OF THE DRAWINGS

There are several ways how to design and further develop the teaching of the present proposed concept in an advantageous way. To this end, it is to be referred to the patent claims subordinate to patent claim 1 on the one hand and to the following explanation of preferred examples of embodiments of the proposed concept, illustrated by the drawing on the other hand. In connection with the explanation of the preferred embodiments of the proposed concept by the aid of the drawing, generally preferred embodiments and further developments of the teaching will be explained. In the drawing

DETAILED DESCRIPTION OF THE INVENTION

Various examples of the present disclosure relate to camera calibration, in particular single camera or non-globally overlapping multiple camera calibration, using co-planar (fiducial) markers. The present disclosure generally relates to computer vision, specifically in the field of single or multi-camera calibration. The proposed concept is particularly applicable to room-scale static indoor multi-camera systems.

The proposed concept focuses on the extrinsic calibration stage of a single or multi-camera system. It is assumed that the cameras in the system have an accurate intrinsic calibration. As part of the proposed method, the pose of each camera in the multi-camera system is determined with respect to a single global reference coordinate system.

Figure 1A:
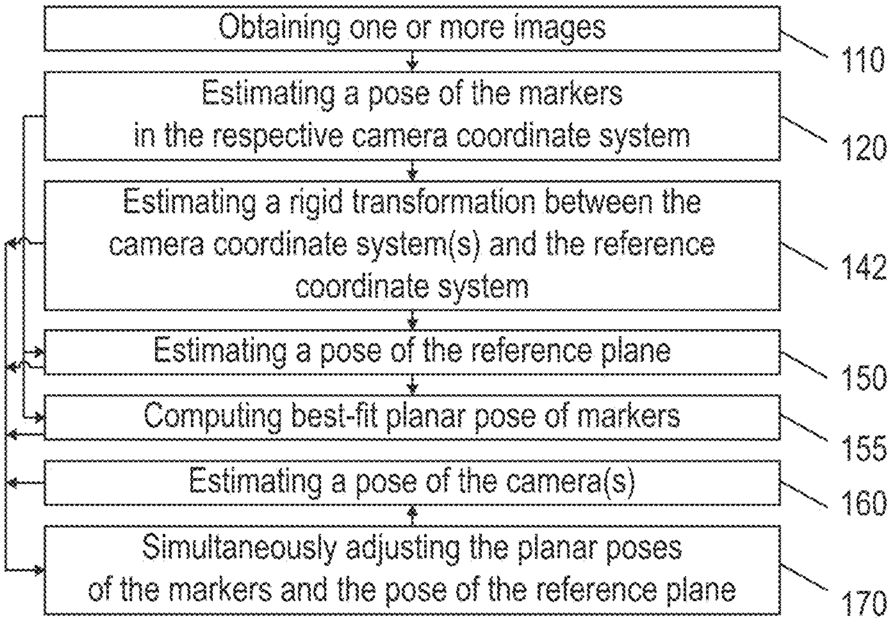
FIGS. 1*a* and 1*b* show flow charts of examples of a computer-implemented method for extrinsic calibration of one or more cameras with respect to a reference coordinate system.
Figure 1C:
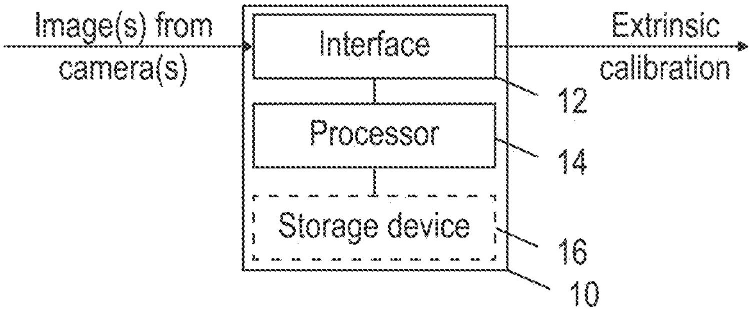
FIG. 1*c* shows a block diagram of an example of an apparatus for extrinsic calibration of one or more cameras with respect to a reference coordinate system.
Figure 1B:
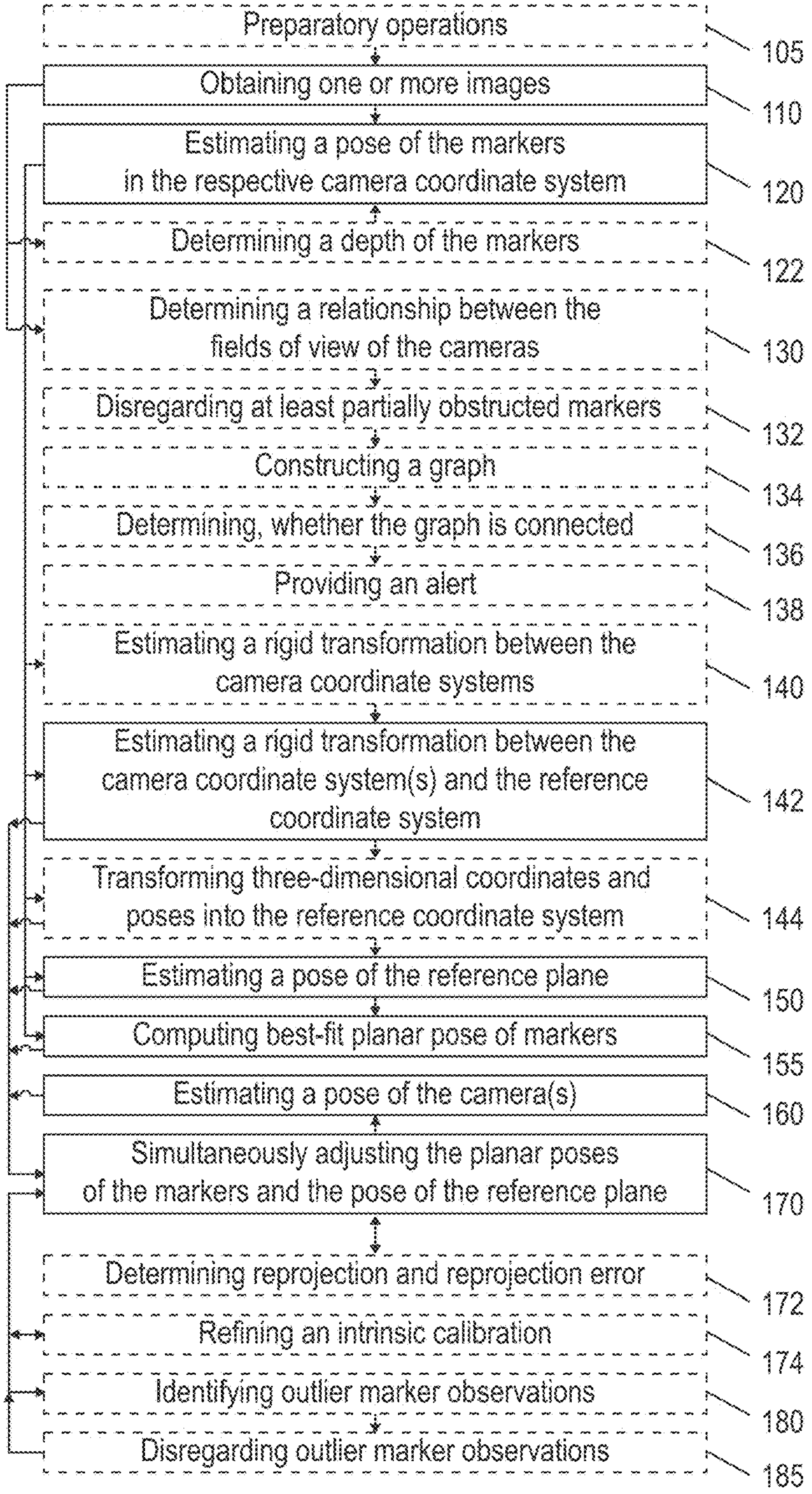

FIGS. 1*a* and 1*b* show flow charts of examples of a computer-implemented method for extrinsic calibration of one or more cameras with respect to a reference coordinate system. The method comprising obtaining 110 one or more images from one or more cameras, with each camera having a field of view. Each image shows an observation of at least one marker of a plurality of markers. The plurality of markers are co-planar with respect to a reference plane. The method comprises estimating 142, for the one or more cameras, a transformation between a respective camera coordinate system and the reference coordinate system based on an estimated pose of the at least one marker observed in the field of view of the camera relative to the camera coordinate system. The method comprises estimating 150 a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system. The method comprises estimating 155 planar poses of the plurality of markers with respect to the reference plane. The method comprises simultaneously adjusting 170 the planar poses of the plurality of markers and the pose of the reference plane with respect to the respective one or more camera coordinate systems by iteratively reducing an error between a reprojection of the plurality of markers, and in particular of the planar poses of the plurality of markers, into the respective one or more camera coordinate systems and the position of the respective markers in the images.

FIG. 1*c* shows a block diagram of an example of an apparatus 10 for extrinsic calibration of one or more cameras with respect to a reference coordinate system. The apparatus 10 comprises one or more interfaces 12 and one or more processors 14. Optionally, the apparatus 10 further comprises one or more memory/storage devices 16. The one or more processors 14 are coupled to the one or more interfaces 12 and to the one or more memory/storage devices 16.

For example, the one or more interfaces 12 may include or correspond to a network interface circuitry and/or a device interface circuitry configured to be communicatively coupled to one or more other devices, such as the one or more processors 14. For example, the one or more interfaces 12 may include a transmitter, a receiver, or a combination thereof (e.g., a transceiver), and may enable wired communication, wireless communication, or a combination thereof. For example, the one or more processors 14 may include or correspond to one or more of a digital signal processor circuitry (DSP), a graphical processing unit (GPU), and/or a central processing unit (CPU). For example, the one or more memory/storage devices 16 may include or correspond to volatile or nonvolatile storage circuitry, such as Random Access Memory (RAM), magnetic disks, optical disks, or flash memory devices. The one or more memory/storage devices 16 may include both removable and non-removable memory devices.

In various examples, the apparatus 10 is configured to perform the method according to FIGS. 1*a* and/or 1*b*. Additionally, or alternatively, the apparatus 10 may be configured to perform at least one of the methods of FIG. 6. In general, the functionality of the apparatus 10 may be provided by the one or more processors 14 performing the respective functionality, in conjunction with the one or more interfaces (for exchanging information with entities inside and/or outside the apparatus 10) and/or the one or more memory/storage devices 16 (for storing information, such as machine-readable instructions). For example, the one or more interfaces 12 may be used, by the one or more processors 14, to obtain one or more images from one or more cameras, such as cameras S, T, U shown in FIGS. 2-4, and/or to control a projector (not shown). For example, examples may provide a system comprising the apparatus 10 and the one or more cameras S, T, U, and optionally the projector. For example, the one or more processors 14 may be configured to execute machine-readable instructions stored in the memory/storage circuitry 14, with the machine-readable instructions specifying the functionality being performed by the one or more processors. For example, the apparatus 10 may be a computer system.

In the following, the method of FIGS. 1*a* and/or 1*b*, and thus the functionality of the apparatus 10 of FIG. 1*c*, is explained in more detail with respect to a concrete algorithm that implements the method. A reference implementation of the algorithm was done using the popular open-source computer vision software library OpenCV. This algorithm is illustrated in connection with FIGS. 2 to 5.

Figure 2:
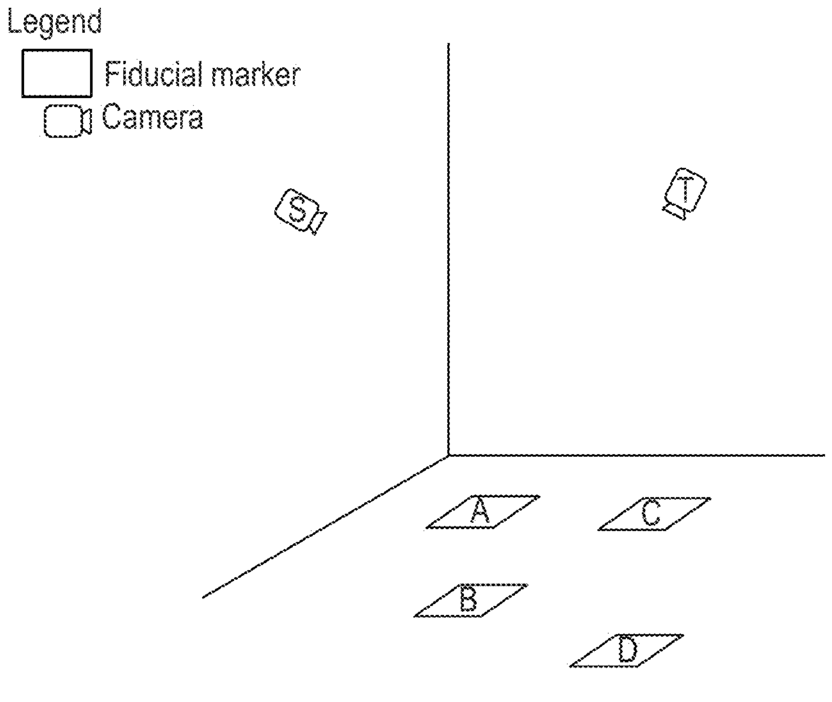
FIG. 2 shows a diagram of a setup of a multi-camera system with co-planar fiducial markers.

In general, the proposed concept may be used with a camera system with one or more cameras (see, for example, FIG. 2) with known intrinsic calibration (lens distortion model and lens parameters). FIG. 2 shows a diagram of a setup of a multi-camera system with co-planar fiducial markers. There are two cameras (S, T) mounted in two different locations. There are four fiducial markers (A, B, C, D) all located in the ground plane. No specific requirements are placed on the camera type. Fiducial markers of known physical dimensions (if no depth measurements are available) are placed inside the field of view (FoV) of the camera system on a common plane (such as the ground or a wall), see FIG. 2. In this context, a "marker observation" refers to the detection of a marker by a specific camera (in multi-shot mode: in a specific image). Two cameras are considered connected if they have an observation of the same marker in any particular image. If the proposed concept is applied in a multi-camera system, the cameras may be non-globally overlapping, i.e., any two cameras in the multi-camera system should be connected through a chain of common observations (i.e., the mathematical graph of cameras, where nodes represent cameras and edges represent common observations, must be connected in the mathematical sense), see FIG. 3.

Figure 3:
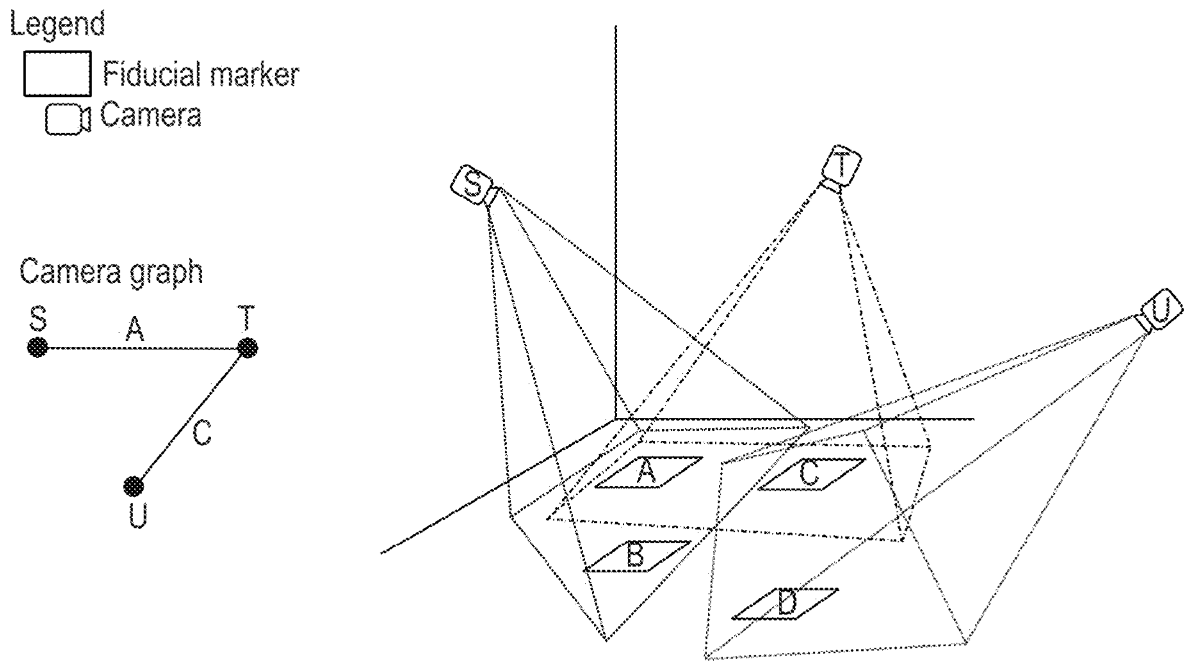
FIG. 3 shows a diagram of a setup of a multi-camera system with co-planar fiducial markers, in which the fields of view of the cameras are illustrated.

In FIG. 3, in addition to FIG. 2, the fields of view of the cameras are annotated. There are three cameras (S, T, U) mounted in different locations. There are four fiducial markers (A, B, C, D). Camera S can observe fiducial markers A and B; the camera T can observe fiducial markers A and C, and the camera U can observe the fiducial markers C and D. No camera can observe all the fiducial markers at once. Cameras S and T share an observation (marker A), whereas camera T and U also share an observation (marker C). Cameras S and T do not share an observation. On the left of the diagram, the camera graph is shown; it has 3 nodes (for cameras S, T and U), and 2 edges (for the observation shared between S and T, and for the observation shared between U and T). In the examples shown in FIGS. 2 to 4, the fields of view of the respective cameras partially overlap, so that, for each camera, there is at least one marker in the field of view of the camera that is also observed in the field of view of another camera.

In the proposed method and algorithm, first, the cameras and markers may be placed in the desired configuration (see FIG. 3). Thus, the method may comprise placing, as part of preparatory operations 105 shown in FIG. 1*b*, the plurality of markers onto the reference plane or a plane that is co-planar with the reference plane. For example, at least one of the plurality of markers may be manually placed, on one of a wall, a floor, and a table of an environment in which the multi-camera system is being used. In this case, this operation is performed manually, not by the computer system/apparatus 10. For example, at least one of the plurality of markers may be printed, by the end-user, onto a sheet of material (such as paper or plastic), and then placed on one of the wall, the floor, and the table of an environment in which the multi-camera system is being used. In the present disclosure, two-dimensional fiducial ArUco markers are used, i.e., markers with a two-dimensional pattern that can be used to distinguish the markers. ArUco markers are two-dimensional markers that can be printed onto sheets of paper or plastic. However, other types of markers may be used as well, as the type of marker being used is nearly arbitrary. To be able to determine a distance of the reference plane, at least one of the markers may be a fiducial marker having known physical dimensions. Alternatively, or additionally, cameras may be used that are able to provide depth measurements along with the images.

In addition to at least one fiducial (i.e., physical) marker, at least one of the markers may be projected by the projector onto one of the wall, the floor, and the table of an environment in which the multi-camera system is being used. For example, the method may comprise controlling, as part of preparatory operations 105, the at least one projector onto the wall, floor, or table.

Regardless of whether fiducial or projected markers are used, the plurality of markers may be distinguishable using one of their characteristics, such as size, pattern included in the marker, shape, color etc. This way, it can be determined when the same marker is observed in the field of view of different cameras.

Optionally, one of the plurality of markers may be designated as the reference marker, which determines the origin of the world/reference coordinate system. Accordingly, the method may comprise (automatically) selecting, as part of preparatory operations 105, a reference marker, and setting an origin of the reference plane based on the position of the reference marker on the reference plane.

Figure 4:
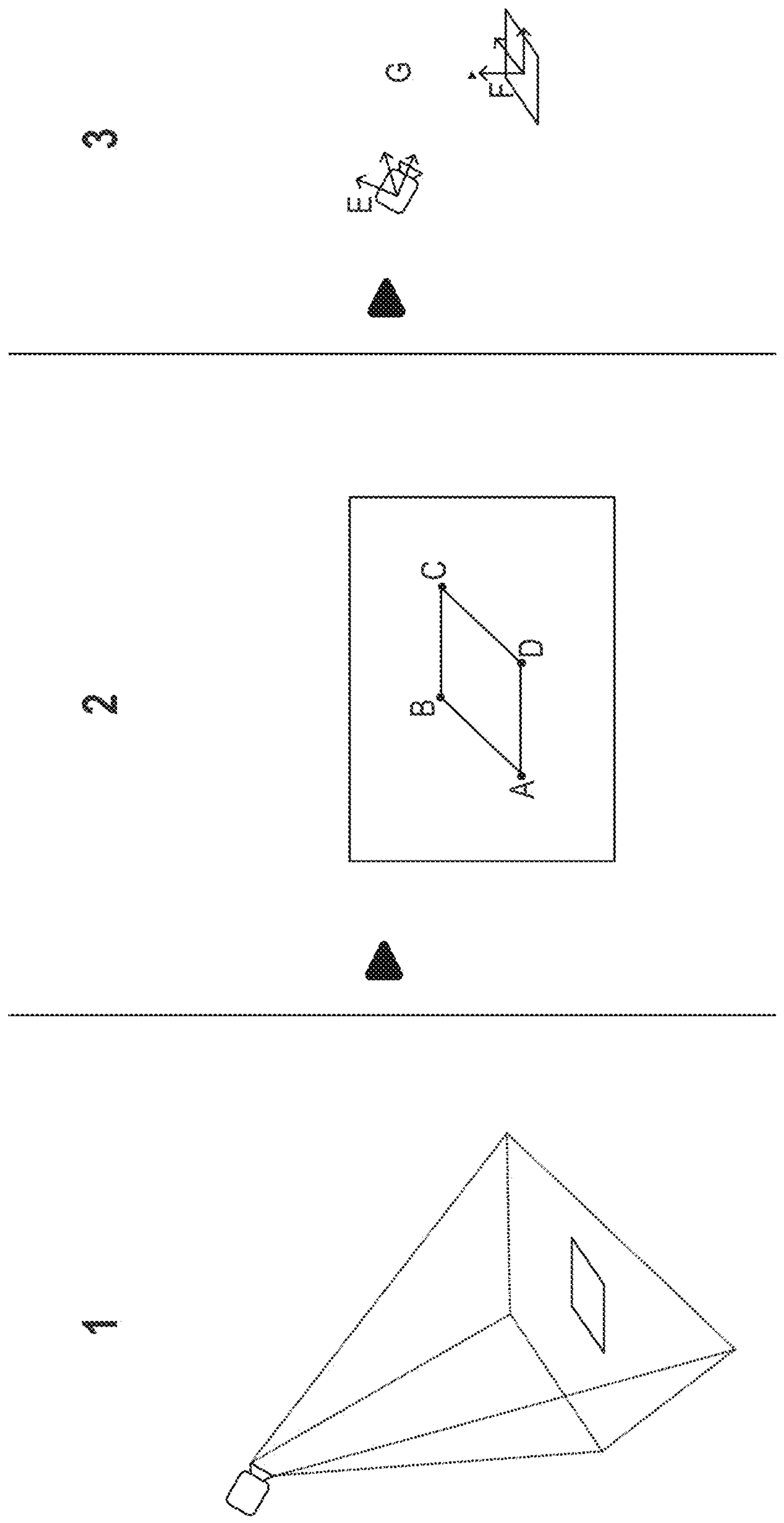
FIG. 4 shows a visual flow chart of an estimation of a pose of a camera with respect to a fiducial marker.

FIG. 4 shows a visual flow chart of an estimation of a pose of a camera with respect to a fiducial marker. The diagram is divided into three stages. In stage 1, a camera is illustrated together with a field of view frustum, containing a fiducial marker. Each of the cameras of the system now captures an image (showing at least one marker), see FIG. 4, stage 1, which is obtained from the cameras to start the extrinsic calibration process embodied by the method of FIGS. 1*a* and 1*b*. This corresponds to operation 110 of FIGS. 1*a* and 1*b*, i.e., obtaining 110 the one or more images from one or more cameras.

In stage 2, the camera has taken an image and the fiducial markers is illustrated inside the image. Each image shows an observation of at least one marker of a plurality of markers, wherein the plurality of markers are co-planar with respect to a reference plane. In the method, the fiducial marker is detected in each image, and the pixel coordinates of keypoints in the fiducial marker are recorded. In this case, the keypoints are the 4 corners of the marker (A, B, C, D), such as would be the case when using an ArUco marker as a fiducial marker.

In stage 3, for each observation (marker+camera pair), the pose of the camera is estimated with respect to the fiducial marker (and thus the pose of the marker with respect to the camera coordinate system). This involves finding a rigid transformation (G) between a coordinate system centered at the camera (E), and a coordinate system centered at the fiducial marker (F). This can be used to determine the 3D coordinates of the corners of the marker, and to estimate 120 (see FIG. 1*b*) three-dimensional coordinates and poses of the markers in the respective one or more camera coordinate systems based on the images.

To start the process, the plurality of markers, and their unique characteristics, may be used to establish a coarse-grained relationship between the fields of view of the cameras. Thus, the method of FIG. 1*b* may comprise determining 130 a relationship between the fields of view of the plurality of cameras based on the at least one marker observed in overlapping regions of the respective fields of view, and in particular based on which markers are observed in the overlapping regions of the fields of view of which cameras. In some cases, one or more markers may be partially obscured, e.g., due to objects or people moving through the scene. In this case, the method may comprise disregarding 132, during the process of determining the relationship between the fields of view of the plurality of cameras, one or more markers that are at least partially obscured by an obstacle in one of the fields of view.

To formally define the relationship between the cameras/nodes, an observation graph may be constructed, which is an unweighted undirected graph where each node represents a camera, and an edge is added if two cameras share an observation of at least one marker (see FIG. 3 on the left). Thus, the method of FIG. 1*b* may comprise constructing 134 a graph, with the graph comprising a plurality of nodes representing the plurality of cameras and a plurality of edges representing markers of the plurality of markers being in overlapping fields of view of two cameras. It is then verified, that the graph is connected; if not, feedback may be provided to the user. In other words, the method may comprise determining 136 the graph to be a connected graph, and providing 138 an alert if the graph is not a connected. In this case, additional markers may be placed, or the pose, and thus FoV, of one or more cameras may be adjusted.

Optionally, a node in the graph may be selected as the reference camera. In other words, the reference coordinate system may be a camera coordinate system of one of the plurality of cameras. For example, the node (camera) with the highest betweenness centrality may be used, although this choice has little effect on the overall process. Alternatively to using a camera coordinate system as reference coordinate system, the reference coordinate system may be defined by the reference plane.

As part of the calibration process, the poses of the camera coordinate systems relative to each other may be determined. In other words, the method may comprise, for at least a subset of the edges of the graph, estimating 140 a rigid transformation between the camera coordinate systems of the cameras being connected by the respective edge. For example, for each edge in the observation graph, the set of common observations may be obtained. The 3D points corresponding to the respective markers in the respective camera coordinate systems are then computed (see above), and an improved or optimal rigid transformation (rotation and translation) between two camera coordinate systems is calculated, by mapping the 3D marker points from one coordinate system to another. The mapping may be iteratively improved or optimized by reducing or minimizing the least-squares error using the Kabsch algorithm. The rigid transformations between the camera coordinate systems may subsequently be used to estimate 142 the transformation between the respective camera coordinate systems and the reference coordinate system, in particular if the reference coordinate system is one of the camera coordinate systems.

Furthermore, for each camera (except the camera corresponding to the reference camera system, if used) the transformation between the respective camera coordinate system and the reference coordinate system is estimated based on the estimated pose of the at least one marker observed in the field of view of the camera relative to the camera coordinate system. This can be done by identifying a shortest path between the camera and the reference camera and composing the rigid transformations between the camera coordinate systems for each edge in the path to obtain an estimated rigid transformation from the camera's coordinate system to the reference camera's coordinate system. The rigid transformation between the camera coordinate systems and the reference coordinate system can then be used to transform 144 (see FIG. 1*b*) the 3D points and pose(s) of the at least one marker observed in the field of view of the camera from the respective camera's coordinate system to the reference camera's coordinate system.

The three-dimensional coordinates of the points of the plurality of markers (in the reference coordinate system) can now be used to estimate the pose of the reference plane with respect to the reference coordinate system. For example, the reference plane may be estimated using a best-fit plane of all the transformed observation points in the reference camera's coordinate system by minimizing the least-square projection error using singular value decomposition (SVD). Accordingly, the method may comprise estimating 150 the pose of the reference plane with respect to the reference coordinate system by fitting poses of the plurality of markers in the reference coordinate system to a plane, with the fitting being based on reducing a least-square projection error. The pose of the reference plane may be recorded in the reference (camera's) coordinate system. The origin of the plane may be centered at the center of the reference marker.

The pose of the reference plane with respect to the reference coordinate system, which is estimated as shown above or is known a priori due to the definition of the reference coordinate system, is then used to estimate (as the pose of the respective camera coordinate systems towards the reference coordinate system is yet to be determined more precisely) the pose of the reference plane with respect to the respective camera coordinate systems (based on the respective rigid transformation between the camera coordinate system and the reference coordinate system). In other words, the pose of the reference plane with respect to the respective one or more camera coordinate systems is estimated 150 based on the pre-defined or estimated pose of the reference plane with respect to the reference coordinate system and based on the estimated transformations between the one or more camera coordinate systems and the reference coordinate system. As a result, the rigid transformation between the camera and the reference camera can be used to obtain (a coarse version) the pose of the camera with respect to the reference plane.

In addition, the planar poses of the plurality of markers are estimated 155 with respect to the reference plane, e.g., by for each marker, reducing a projection error onto the reference plane or a plane being co-planar with the reference plane for the observation or observations of the marker. For example, for each marker, the best-fit planar pose may be calculated by minimizing the least-square projection error onto the reference plane for all observations of the marker in the reference camera's coordinate system. The planar pose may comprise or consist of a single rotation angle and a 2D translation vector with respect to the plane's origin. In other words, the planar poses may be constrained to a single rotation angle and a two-dimensional translation vector with respect to the reference plane or to a plane being co-planar to the reference plane. The optimal planar pose can be initially estimated by averaging the coordinates of all observations and then further refined using the Levenberg-Marquardt algorithm. The pose of the reference marker is trivial (zero translation and angle).

The planar pose of each marker and the pose of each camera with respect to the reference plane may be close to optimal at this point, and further refinement may further improve the precision. In particular, the pose of each marker and the pose of the reference plane with respect to each camera may be adjusted (i.e., improved or optimized) simultaneously, e.g., using the Levenberg-Marquardt algorithm, by reducing or minimizing the least-square reprojection error of the detection. In other words, the method of FIGS. 1*a* and 1*b* comprises simultaneously adjusting 170 the planar poses of the plurality of markers and the pose of the reference plane with respect to the respective one or more camera coordinate systems by iteratively reducing the error between a reprojection of the plurality of markers into the respective one or more camera coordinate systems and the position of the respective markers in the images. For example, using the pose of a camera and the planar pose of the marker, the projection of the marker onto the image plane of the camera can be calculated and compared to the originally detected marker points (in the image plane). For example, the method of FIG. 1*b* may comprise determining 172 the reprojection of the plurality of markers into the respective one or more camera coordinate systems based on the planar poses of the plurality of markers, which may represent three-dimensional coordinates and poses of the plurality of markers in the reference coordinate system. In particular, reprojection is performed based on the planar poses of the respective markers, i.e., with three of the six parameters of the pose of the planar markers being determined by the planar poses of the markers. In particular, the planar poses include both the position (2 parameters) and the rotation in the plane (1 parameter). Both the position and the rotation are used for the reprojection, because a marker is not a single point but a collection of points with known spatial relationship (e.g. for an ArUco marker, it is four corners). The planar pose may, for example, represent the translation of the center of this marker to the plane's origin, and the rotation of the center of the marker around the normal of the plane. The markers are projected according to their planar poses on or co-planar with the reference plane into the respective camera coordinate system. The reprojection may then be compared to the points of the respective markers in the respective camera coordinate system to determine the reprojection error. This procedure is mathematically differentiable and can thus be efficiently optimized.

In particular, not the individual reprojection errors, but rather the combined reprojection error of each observation may be minimized. In other words, the planar poses of the plurality of markers and the pose of the reference plane with respect to the respective camera coordinate systems may be adjusted 170 with the goal of reducing a combination of the reprojection errors (i.e., the combined reprojection error, e.g., a sum of the reprojection errors) simultaneously for the plurality of cameras. The planar pose of the reference marker may be kept fixed at a value of 0.

In the following, the adjustment (i.e., optimization) procedure is described in more detail. In the following, $N_c$ is the number of cameras, $N_m$ is the number of markers, $N_f$ is the number of corners of the number of corners of a (fiducial) marker. $m_i$ is an index denoting a marker, and $c_j$ is an index denoting a camera. The Rodrigues transformation Rod: $\mathbb{R}^3 \rightarrow SO(3)$ is defined for converting a rotation vector to a rotation matrix. It also has a right-inverse: $Rod^{-1}: SO(3) \rightarrow \mathbb{R}^3$. It is not a left-inverse because the Rodrigues rotation vector format is not unique. A rotation vector $r \in \mathbb{R}^3$ describes a rotation around the axis $r/|r|$ with angle $|r|$. This format is in the following used for the adjustment/optimization because it is differentiable, and smooth away from the origin. A rigid transformation is given by 3d-pose $A_p$: $\mathbb{R}^3 \rightarrow \mathbb{R}^3$, where $p \in \mathbb{R}\ R^{3+3}$ is a pose. If p=(r, t), this is given by $A_p(x)=Rod(r)(x)+t$. The notion of a 'pose' and a rigid transformation in 3d are thus equivalent but have different characterizations (a 6D vector vs. an affine transformation). The 3D pose of marker is $p_m=(r_m, t_m)\in\mathbb{R}^{3+3}$. The pose of the ith marker is denoted by $p_{m_i}$.

A 2D plane is assumed to have a coordinate system. A 2D plane with a coordinate system is uniquely defined by a pose/rigid transformation comparing it to the 'standard' plane which has the origin at (0,0,0) and has the y direction as its normal. The pose of an object lying in a plane can be described by three parameters: the 2D translation from the plane's origin and the rotation angle around the plane's normal.

The transformation from a planar pose $q=(s, \alpha)\in\mathbb{R}^{2+1}$ to a 3D pose, given the plane's pose p, is denoted by $L_p$: $\mathbb{R}^{2+1}\rightarrow^{3+3}$. The normal vector of the plane is given by $n=A_p(e_2)$ where $e_i$ is the ith elementary vector (all zeros except at position i where it is 1). The rotation vector part of $L_{p(q)}$ is given by $\alpha n=\alpha A_p(e_2)$. The translation vector part of $L_p(q)$ is given by $A_p((s_1, 0, s_2))$. The planar pose of marker $q_m=(s_m, \alpha_m)\in\mathbb{R}^{2+1}$. The planar pose of the ith marker is denoted by $q_{m_i}$. The pose of a plane in camera coordinates $p_c=(r_c, t_c)\in\mathbb{R}^{3+3}$. The pose of the jth camera is denoted by $p_{c_j}$.

Transformation from camera coordinates to pixel coordinates $\pi_c$: $\mathbb{R}^3\backslash\{0\}\rightarrow\mathbb{R}^2$ may be performed using a pinhole camera model. This depends on the camera's intrinsic calibration, which can be represented as a 3×3 matrix $M_c$. Then $$\pi_c(x) = \left(xM_c^T\right)[1:2]/\left(xM_c^T\right) \quad [3]$$

where y[1:2] denotes the vector containing the first two entries of a vector y and y[3] denotes the third entry of a vector y. The corners of a fiducial marker in the coordinate system of the marker: $u_1, \ldots, u_{N_f}\in\mathbb{R}^3$. In the following, the y coordinate of each marker is 0 for 'flat' markers such as checkerboards or ArUco markers. The observed corners of a fiducial marker $m_i$ in the pixel coordinate system of camera $c_j$ are denoted by $v_{m_i,c_j,1}, \ldots, v_{m_i,c_j,N_f}$. It is assumed that lens correction has been applied to these coordinates so that a pinhole camera model applies.

To simultaneously adjust the planar poses and the pose of the reference plane with respect to the respective one or more camera coordinate systems, an optimization problem may be defined. The parameters to optimize are the planar poses of the markers except the master marker (which is assumed without loss of generality has index $N_m$), since the planar pose of the master marker can be $$q_{m_{N_m}} = 0.$$

Thus the parameters to be optimized are:

$$\left(q_{m_1}, \ldots, q_{m_{N_m-1}}, p_{c_1}, \ldots, p_{c_{N_c}}\right).$$

The optimization algorithm also depends on the observed corners $v_{m_i,c_j,k}$ and the intrinsic matrices $M_{c_j}$ but these parameters are considered fixed.

The following algorithm estimates the pixel coordinates of the corner k of the fiducial marker m in the pixel coordinate system of the camera c.

$x \leftarrow L_{p_c}(q_m)$ (3*d* pose of the marker in camera coordinates)

$w_{m,c,k} \leftarrow \pi_c(A_x(u_k))$ (3*d* pose of the *kth* marker corner in pixels coordinates)

Each camera c observes a set of markers $m_{c_1}, \ldots, m_{c_2}$. The algorithm above may be applied for each corner of the fiducial marker, for each marker observation for each camera. This leads to a set $w_{m,c,k}$ of the same size as the set of observed corners $v_{m,c,k}$ defined above.

The optimization problem can now be phrased as a least squares problem with loss function:

$$L\left(q_{m_1}, \ldots, q_{m_{N_m-1}}, p_{c_1}, \ldots, p_{c_{N_c}}\right) = \frac{1}{2}\sum_{m,c,k}(w_{m,c,k} - v_{m,c,k})^2$$

This loss function is differentiable, and thus can be solved with ordinary methods such as Levenberg-Marquardt optimization. It does need a good initialization, since only convergence to a local minimum is guaranteed.

A core component of the proposed algorithm is the operation $x\leftarrow L_{p_c}(q_m)$. Other algorithms may use $x\leftarrow A_{p_c}(p_m)$ to estimate the three-dimensional pose of the marker in camera coordinates. The proposed approach has the advantage that it does not decouple the optimization problem. The pose of a marker does not affect the poses of any other markers, and this way they can't share information. In the present case, the pose of each marker affects the pose of every other marker because they depend on the pose of the plane. This makes the optimization problem more well-conditioned, and it makes it robust to outliers. In other algorithms, it is often not possible to detect if a camera detects a marker to be in a completely wrong place because of this decoupling. In the proposed algorithm, such a marker would not fit in the plane, and it is easy to detect that it is an outlier. It can be automatically removed. This can also drastically improve the final error/loss of the algorithm. Moreover, existing algorithms do not make use of the fact that multiple markers are in the same plane. Any information we use about the real-world configuration will improve the accuracy of the estimated marker and camera poses, and thereby improve the accuracy of the calibration. Moreover, the number of parameters is reduced, as only 3 parameters are used per marker instead of 6.

At this stage, outlier rejection can be performed. For example, the method of FIG. 1*b* may comprise identifying 180, during the adjustment of the planar poses and the pose of the reference plane with respect to the respective one or more camera coordinate systems, one or more outlier marker observations based on the error between the reprojection of the respective marker into the camera coordinate system and the position of the respective marker in the image. For example, any observation with an absolute deviation reprojection error sufficiently larger (e.g., larger by a pre-defined absolute or percentual threshold) than the median absolute deviation (MAD) may be rejected (e.g., disregarded), and the optimization routine may be repeated until convergence. Accordingly, the method may comprise disregarding 185 the outlier marker observations (e.g., during the adjustment/optimization process, and/or during other portions of the algorithm). Other methods of outlier detection can be used instead of a MAD threshold.

In summary, the proposed concept may be used for extrinsic calibration of a multi-camera system with known intrinsic calibration. In this context, the extrinsic calibration may correspond to the pose of the one or more camera coordinate systems with respect to the reference coordinate systems and may be based on the pose of the reference plane with respect to the respective one or more camera coordinate systems and the reference coordinate system. Fiducial markers (or other markers) of known physical dimensions (at least one of the markers) are placed or projected on a common plane (i.e., the reference plane). For example, an observation graph representing camera connectivity may be generated based on shared marker observations. A reference camera and reference marker may be used to establish the world coordinate system. Rigid transformations between camera coordinate systems may be obtained through the Kabsch algorithm. The reference plane may be estimated using SVD and least-square projection error minimization. Planar poses of markers may be computed using least-square projection error minimization and the Levenberg-Marquardt algorithm. Camera poses with respect to the reference plane may be derived from rigid transformations. Simultaneous optimization of marker and camera poses may be performed using the Levenberg-Marquardt algorithm, minimizing reprojection error. Outlier rejection may be performed, e.g., based on a median absolute deviation of reprojection errors.

In some examples, the proposed concept can be extended to multiple reference planes. For example, the images may show two or more sets of markers being co-planar with two or more reference planes. For example, each (fiducial or projected) marker may be associated with a specific reference plane. In some examples, the user of the proposed concept can manually mark specific fiducial markers as belonging to a specific reference plane. Alternatively, or additionally, the respective reference plane can be encoded into the (fiducial) marker itself. For instance, an ArUco fiducial marker encodes a numerical identifier. Certain ranges of numerical identifiers can then be mapped to a reference plane. Alternatively, or additionally, fiducial markers can be mapped to specific reference planes automatically. For any two fiducial markers, a score can be assigned how likely they are to be in the same plane by estimating the pose of the markers in three dimensions without the coplanarity assumptions. Any measure of coplanarity can be used, such as the angle between the planes of the fiducial markers. Conventional clustering algorithms such as k-means can then be used to cluster the markers into reference planes. The correct number of reference planes can be determined by examining the relationship between a loss function and the number of reference planes. The correct number of reference planes can be achieved after a sharp drop off in the loss function. Several loss functions are appropriate, such as the within-cluster variance, the variance of the reprojection errors of the optimized marker poses, or the total reprojection error of the optimized poses.

Once the sets of markers are determined/distinguished, the planar poses of the two or more sets of markers may be estimated with respect to the two or more reference planes, and the poses of the two or more reference planes may be estimated with respect to the respective one or more camera coordinate systems based on the pre-defined or estimated poses of the two or more reference planes with respect to the reference coordinate system and based on the estimated transformations between the one or more camera coordinate systems and the reference coordinate system. The planar poses of the plurality of markers and the pose of the two or more reference planes with respect to the respective one or more camera coordinate systems may be simultaneously adjusted by iteratively reducing the error between the projection of the markers (e.g., the planar poses thereof) into the respective one or more camera coordinate systems and the position of the markers in the images.

In many examples, it was assumed that the extrinsic calibration is performed on multiple cameras. However, the proposed concept may be used to improve the accuracy in calibrating single-camera systems as well. The coplanarity assumption used by the calibration algorithm still improves the accuracy and robustness of the calibration compared to conventional calibration methods using fiducial markers.

While the proposed concept relates to extrinsic calibration of the camera(s) of the system with respect to the reference coordinate system and/or reference plane assumes known accurate intrinsic calibration for all the cameras in the multi-camera system, it can also be used to improve the intrinsic calibration of the camera(s). For example, the intrinsic calibration can also be simultaneously estimated together with the extrinsic calibration in a bundle adjustment procedure. This is possible because the reprojection error being optimized depends in a differentiable manner on the intrinsic calibration and can thus be simultaneously optimized using the Levenberg-Marquardt algorithm. Accordingly, the method may comprise refining 174 the intrinsic calibration of the one or more cameras during the adjustment of the planar poses of the plurality of markers and the pose of the reference plane with respect to the respective one or more camera coordinate systems. More generally, the method may comprise refining 174 the intrinsic calibration of the one or more cameras based on the markers being co-planar to the reference plane. This is especially useful when the intrinsic calibration just needs fine-tuning. For example, the intrinsic calibration may change slightly when installing a camera or adjusting the aperture or focus of a camera.

As outlined above, instead of or in addition to using fiducial markers, projected markers may be used to perform the calibration. Using a moving projection system and a single reference marker (not necessarily visible to all cameras), the multi-camera system can be automatically calibrated. A moving projection system can refer to light projector (optionally equipped with a gobo) or a video projector with adjustable pan and tilt. The projection system can project a pattern onto one or more reference planes such as the floor or a wall. The pattern can then be detected by multiple cameras and used as a fiducial marker. Due to the projection, the shape and size of the pattern is distorted. However, the shape distortion can be accurately modelled once the pose of the projection system is known. The projection system then projects the pattern onto distinct locations with known pan and tilt values, and using the Levenberg-Marquardt algorithm the pose all the cameras as well as the projection system can be simultaneously determined up to a global scale factor. The global scale factor can be determined using a single fiducial marker of known size, visible to at least one camera. The advantage of this calibration procedure is that it can be done automatically without user interaction, and only requires a single fiducial marker to be present in the scene (which may be left there permanently).

While the proposed concept principally focuses on conventional camera systems, the depth information provided by camera systems such as RGBD (Red Green Blue Depth) cameras (which combine a depth sensor together with a conventional camera sensor) or stereo cameras (which comprise multiple camera sensors in a single unit, with a known spatial relationship between the sensors), can be used to further improve the accuracy of the multi-camera calibration. Accordingly, the images may comprise depth information, and the method may comprise determining 122 a depth of the plurality of markers in the respective one or more camera coordinate systems and in the reference coordinate system based on the depth information. Rather than just minimizing the reprojection error, the optimization process can minimize a combined reprojection error and depth error. Accordingly, the method may comprise simultaneously adjusting 170 the planar and the pose of the reference plane with respect to the respective one or more camera coordinate systems by iteratively reducing a combined reprojection and depth error between the reprojection of the plurality of markers into the respective one or more camera coordinate systems and the position and depth of the respective markers in the images.

The proposed concept may be implemented using a camera system comprising one or more cameras, a set of coplanar fiducial markers placed withing the field of view of the camera system, and a method for calibrating the camera system using the coplanar fiducial markers. The method comprises detecting the fiducial markers in images captured by the camera system. The method comprises establishing a reference coordinate system and a reference plane based on the detected markers, and determining the relative pose between the cameras and the reference coordinate system. A key component of the method is to leverage the coplanarity constraint of the fiducial markers to improve both the accuracy and the robustness to false detections of the calibration of the camera system.

The proposed calibration concept is robust to outliers and spurious marker detections by leveraging partial knowledge of marker spatial relationships. The proposed concept establishes a highly accurate reference plane enabling various downstream uses, such as improved calibration accuracy for screens projected onto or parallel to the reference plane, a floor plane constraint for markerless motion capture, providing physical priors, highly accurate single-camera tracking via projection onto the reference plane, or enhanced photogrammetry precision for objects in or parallel to the reference plane. The proposed concept can be implemented with single-shot operation (with multi-shot support, i.e., using multiple images from each camera, with markers potentially being moved in between capturing the images, allowing to use individual markers in different positions, while potentially giving feedback to the user about the calibration converging) without requiring specialized markers or operator training. It is agnostic to marker type, compatible with established open-source marker detection methods. It also supports multiple reference frames and automatically determines their spatial relationships.

The proposed concept may improve upon some other approaches in several key aspects. By requiring fiducial markers to lie in the same plane, it establishes a highly accurate reference plane in a robust manner. This enables a range of downstream applications with improved accuracy. The method is flexible, working with standard markers and detection algorithms, and does not require difficult manufacturing or specialized training. Multi-shot support further extends its advantages over existing techniques. Overall, the proposed concept provides a more accurate, robust, and widely applicable approach for calibrating static room scale non-globally overlapping multi-camera systems.

The result of the extrinsic calibration includes a highly accurate reference plane, which has multiple downstream uses, which are illustrated in connection with FIGS. 5 and 6.

Figure 6:
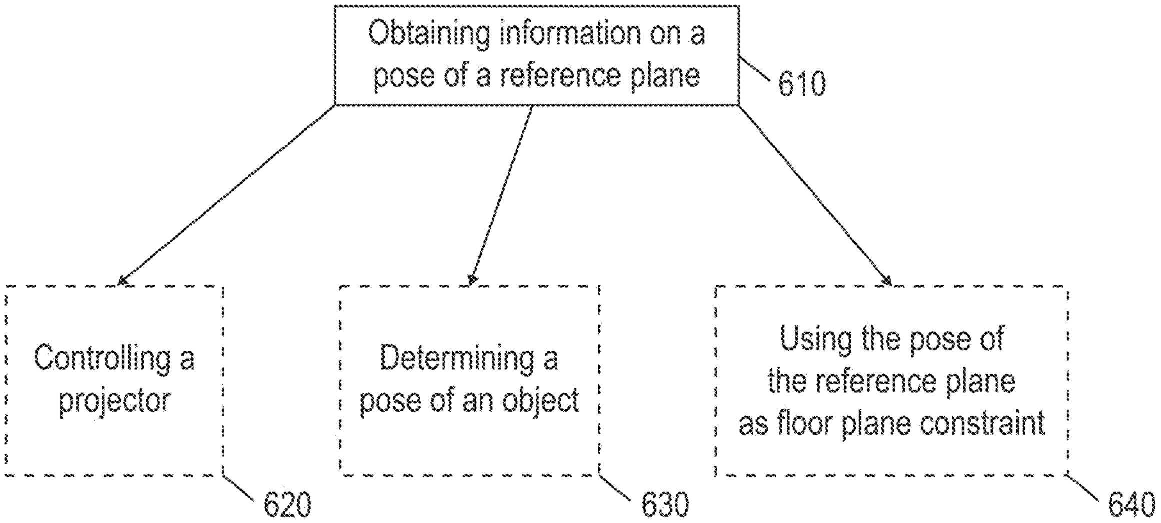
FIG. 6 shows a flow chart of different methods being based on the determination of the reference plane.

FIG. 6 shows a flow chart of different methods being based on the determination of the reference plane. For example, FIG. 6 shows a flow chart of a method for projecting an image onto a surface. In this method, the highly accurate reference plane is used to improve a calibration accuracy for video projection systems projecting onto the reference plane. Accordingly, the method may comprise obtaining 610 information on a pose of a reference plane with respect to a reference coordinate system (as determined above), and controlling 620 the projector to project an image onto the surface based on the information on the pose of the reference plane, with the surface corresponding to the reference plane or being co-planar to the reference plane. In this case, a video projection system may project a dynamic image onto a plane. For augmented reality purposes it is desirable to know the mapping of pixels in the image plane of the projection system to 3d points in the real world. To do such a calibration, the projection system can project a pattern (such as a checkerboard, ArUco board, or ChArUco board) which is then detected by one or more calibrated cameras. Having precise knowledge of the relation between the cameras and the plane onto which the projection system is projection allows for more accurate calibration. Additionally, or alternatively, the highly accurate reference plane is used to obtain an improved calibration accuracy for moving projection systems, such as light projectors (optionally equipped with a gobo) or a video projector with adjustable pan and tilt. Like above, calibration of a projection system can be performed by projecting patterns at different pan and tilt settings onto a reference plane. If the extrinsic calibration of the system has been previously performed using the proposed concept, then the precise knowledge of the reference plane can be used to improve the accuracy of the calibration of the moving projector system.

Figure 5:
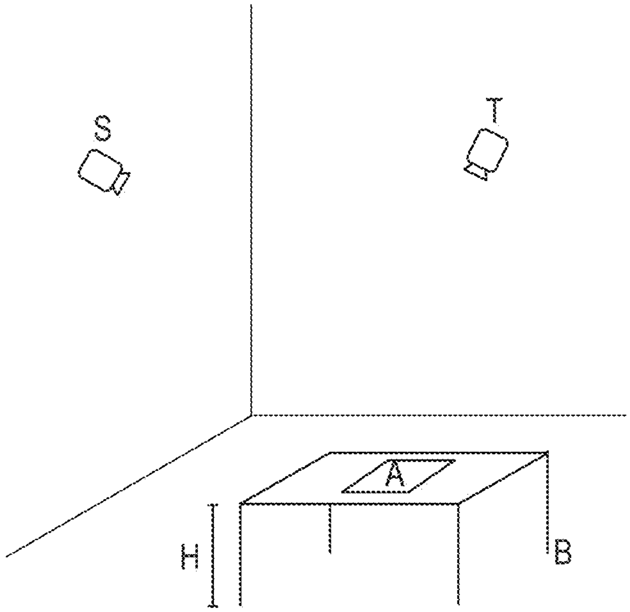
FIG. 5 shows a diagram of a fiducial marker being placed on a surface of a table, with the surface being co-planar to a floor.

The highly precise reference plane may also be used for enhanced pose estimation of objects with parallel to the reference plane (as shown in FIG. 5), if an object is placed on a table standing on the ground. FIG. 5 shows a diagram of a fiducial marker (A) being placed on a surface of a table, with the surface being co-planar to a floor. The fiducial marker (A) is placed coplanar to a reference plane. In this case the ground plane is the reference plane, and the marker (A) is placed on a table (B). Two calibrated cameras (S, T) can view the marker. Optionally the distance between the marker's plane and the reference plane may be known, in this case this is the height of the table (H).

In general, the 3D pose of an object consists of 6 parameters (3 rotation and 3 translation parameters). If the object is known to be parallel to a reference plane this is reduced to 4 parameters (1 parameters is the distance between the reference plane and the object's plane, 2 parameters are the translation inside the object's plane, and 1 is the rotation angle of the object inside its plane). Knowledge on the reference plane thus allows to perform pose estimation more precisely if the object/human on which pose estimation is performed is assumed to be parallel to the reference plane. FIG. 6 further shows a flow chart of a method for determining a pose of an object. The method comprises obtaining 610 information on a pose of a reference plane with respect to a reference coordinate system (as determined above) and determining 630 the pose of the object based on the pose of the reference plane with respect to the reference coordinate system, with the object being assumed to be parallel to a surface corresponding to the reference plane or being coplanar to the reference plane.

If the distance of the object's plane with respect to the reference plane is known, the determination of the pose can be reduced to 3 parameters, further improving accuracy. This is for example possible if the object is known to lie on a table of known height. This applies to a variety of objects, such as a fiducial marker such as an ArUco marker. If this marker additionally has a known numerical identifier, then it can be used for marking an object in the scene of some significance. For instance, a specific numerical identifier can correspond to a 3-dimensional box of a specific size, to mark certain areas in an augmented reality system. This also applies to a moving object, such as a robot with a fiducial marker placed on top in such a way as to be parallel to the floor. If in addition the height of the object is known, then the object's pose can be located with high accuracy.

While the pose estimation can be done using a single calibrated camera, using a multi-camera system typically improves accuracy.

The highly precise reference plane may also be used as a floor plane constraint, e.g., for markerless motion capture or object tracking. FIG. 6 further shows a flow chart of an example of a method for markerless motion capture or motion capture. The method comprises obtaining 610 information on a pose of a reference plane with respect to a reference coordinate system (as determined above), and using 640 the pose of the reference plane with respect to the reference coordinate system as floor plane constraint, e.g., for the markerless motion capture or object tracking. Using the reference plane as a floor plane constraint for markerless motion capture provides the markerless capture with physical priors. In markerless motion capture, the physical 3D pose of one or more persons is estimated using a calibrated multi-camera system such as the one the proposed concept deals with. Knowledge of certain reference planes, particularly the floor, allows for more accurate pose estimation in this domain, since it provides physical priors about the persons pose. For example, the following assumptions can be used as prior knowledge: A person is never below the floor (or cannot pass through a wall). Moreover, the contact point between a person's foot and the floor does not usually move while the person is walking or running, and at least one foot is usually touching the ground. Thus, in markerless motion capture, the reference plane can be used to determine (or at least limit) the position of at least one foot. Moreover, if a person is standing, falling, or lying, the reference plane can be assumed to be the floor the person is standing on, falling onto, or lying on.

Moreover, the reference plane can used as floor plane constraint for accurate single-camera tracking via projection onto the reference plane. Under normal circumstances, the bounding box of any detected object (such as a person) is touching the floor plane. Using this assumption, the projection of the bottom of the bounding box to the floor plane can be accurately determined, even from a single camera. Tracking the two-dimensional coordinates of the projection onto the floor plane is more stable and accurate than tracking the entire bounding box. This can be used to improve multi-person tracking. It makes the assignment problem of assigning detected persons to tracked persons easier and more accurate.

In the context of the present disclosure, the term "optimization" does not necessarily relate to a process that is successful at determining an optimal set of parameters (e.g., planar poses and poses of the camera coordinate systems with respect to the reference plane), but rather to a process that strives to improve the set of parameters compared to an initial set of parameters.

Many modifications and other embodiments of the proposed concept set forth herein will come to mind to the one skilled in the art to which the proposed concept pertains having the benefit of the teachings presented in the foregoing description and the associated drawings. Therefore, it is to be understood that the proposed concept is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for extrinsic calibration of one or more cameras with respect to a reference coordinate system, the method comprising:

obtaining one or more images from one or more cameras, with each camera having a field of view, wherein each image shows an observation of at least one marker of a plurality of markers, wherein the plurality of markers are co-planar with respect to a reference plane, estimating, for the one or more cameras, a transformation between a respective camera coordinate system and the reference coordinate system based on an estimated pose of the at least one marker observed in the field of view of the camera relative to the camera coordinate system;

estimating a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system;

estimating planar poses of the plurality of markers with respect to the reference plane; and simultaneously adjusting the planar poses of the plurality of markers and the pose of the reference plane with respect to the respective one or more camera coordinate systems by iteratively reducing an error between a reprojection of the plurality of markers into the respective one or more camera coordinate systems and the position of the respective markers in the images.

2. The method according to claim 1, wherein the one or more cameras are a plurality of cameras having a plurality of camera coordinate systems, wherein the fields of view of the respective cameras partially overlap, so that, for each camera, there is at least one marker in the field of view of the camera that is also observed in the field of view of another camera.

3. The method according to claim 1, wherein the method comprises estimating three-dimensional coordinates and poses of the plurality of markers in the respective one or more camera coordinate systems based on the images, transforming the three-dimensional coordinates and poses into the reference coordinate system, determining the planar poses of the plurality of markers, and determining the reprojection of the plurality of markers into the respective one or more camera coordinate systems based on the planar poses of the plurality of markers.

4. The method according to claim 1, wherein the method comprises estimating the pose of the reference plane with respect to the reference coordinate system by fitting poses of the plurality of markers in the reference coordinate system to a plane, with the fitting being based on reducing a least-square projection error.

5. The method according to claim 1, wherein the planar poses are constrained to a single rotation angle and a two-dimensional translation vector with respect to the reference plane or to a plane being co-planar to the reference plane.

6. The method according to claim 1, wherein the method comprises identifying, during the adjustment of the planar poses and the pose of the reference plane with respect to the respective one or more camera coordinate systems, one or more outlier marker observations based on the error between the reprojection of the respective marker into the camera coordinate system and the position of the marker in the image, and disregarding the outlier marker observations.

7. The method according to claim 1, wherein the images show two or more sets of markers being co-planar with two or more reference planes, wherein the planar poses of the two or more sets of markers are estimated with respect to the two or more reference planes, the poses of the two or more reference planes are estimated with respect to the respective one or more camera coordinate systems based on the pre-defined or estimated poses of the two or more reference planes with respect to the reference coordinate system and based on the estimated transformations between the one or more camera coordinate systems and the reference coordinate system, and the planar poses of the plurality of markers and the pose of the two or more reference planes with respect to the respective one or more camera coordinate systems are simultaneously adjusted by iteratively reducing the error between the reprojection of the plurality of markers into the respective one or more camera coordinate systems and the position of the respective markers in the images.

8. The method according to claim 1, wherein the plurality of markers comprise at least one fiducial marker that is manually placed on one of a wall, a floor, and a table of an environment in which the multi-camera system is being used, and/or wherein the plurality of markers comprise at least one marker that is printed onto a sheet of material to be placed on one of a wall, a floor, and a table of an environment in which the multi-camera system is being used, and/or wherein the plurality of markers comprises at least one projected marker being projected by a projector onto one of the wall, the floor, and the table of an environment in which the multi-camera system is being used.

9. The method according to claim 1, wherein the images comprise depth information, wherein the method comprises determining a depth of the plurality of markers in the respective one or more camera coordinate systems and in the reference coordinate system based on the depth information, and wherein the method comprises simultaneously adjusting the planar and the pose of the reference plane with respect to the respective one or more camera coordinate systems by iteratively reducing a combined reprojection and depth error between the reprojection of the plurality of markers into the respective one or more camera coordinate systems and the position and depth of the respective markers in the images.

10. The method according to claim 2, wherein the planar poses of the plurality of markers and the pose of the reference plane with respect to the respective camera coordinate systems are adjusted with the goal of reducing a combination of the reprojection errors simultaneously for the plurality of cameras.

11. The method according to claim 2, wherein the method comprises determining a relationship between the fields of view of the plurality of cameras based on the at least one marker observed in overlapping regions of the respective fields of view.

12. The method according to claim 11, wherein the method comprises constructing a graph, with the graph comprising a plurality of nodes representing the plurality of cameras and a plurality of edges representing markers of the plurality of markers being in overlapping fields of view of two cameras.

13. The method according to claim 12, wherein the method comprises, for at least a subset of the edges of the graph, estimating a rigid transformation between the camera coordinate systems of the cameras being connected by the respective edge, and estimating the transformation between the respective camera coordinate systems and the reference coordinate system based on the rigid transformations between the camera coordinate systems.

14. An apparatus for extrinsic calibration of one or more cameras with respect to a reference coordinate system, the apparatus comprising one or more processors and one or more interfaces, wherein the processor is configured to:

obtain, via the one or more interfaces, one or more images from one or more cameras, with each camera having a field of view, wherein each image shows an observation of at least one marker of a plurality of markers, wherein the plurality of markers are co-planar with respect to a reference plane, estimate, for the one or more cameras, a transformation between a respective camera coordinate system and the reference coordinate system based on an estimated pose of the at least one marker observed in the field of view of the camera relative to the camera coordinate system;

estimate a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system;

estimate planar poses of the plurality of markers with respect to the reference plane; and simultaneously adjust the planar poses of the plurality of markers and the pose of the reference plane with respect to the respective one or more camera coordinate systems by iteratively reducing an error between a reprojection of the plurality of markers into the respective one or more camera coordinate systems and the position of the respective markers in the images.

15. A non-transitory, computer-readable medium comprising a program code that, when the program code is executed on a processor, a computer, or a programmable hardware component, causes the processor, computer, or programmable hardware component to perform a method for extrinsic calibration of one or more cameras with respect to a reference coordinate system, the method comprising:

obtaining one or more images from one or more cameras, with each camera having a field of view, wherein each image shows an observation of at least one marker of a plurality of markers, wherein the plurality of markers are co-planar with respect to a reference plane, estimating, for the one or more cameras, a transformation between a respective camera coordinate system and the reference coordinate system based on an estimated pose of the at least one marker observed in the field of view of the camera relative to the camera coordinate system;

estimating a pose of the reference plane with respect to the respective one or more camera coordinate systems based on a pre-defined or estimated pose of the reference plane with respect to the reference coordinate system and based on the estimated transformations between the one or more camera coordinate systems and the reference coordinate system;

estimating planar poses of the plurality of markers with respect to the reference plane; and simultaneously adjusting the planar poses of the plurality of markers and the pose of the reference plane with respect to the respective one or more camera coordinate systems by iteratively reducing an error between a reprojection of the plurality of markers into the respective one or more camera coordinate systems and the position of the respective markers in the images.

* * * * *